Patented Oct. 30, 1973     3,768,891

Patented Oct. 30, 1973  3,768,892

EYEGLASSES WITH COUNTERBALANCED TEMPLE PIECES

BACKGROUND OF THE INVENTION

This invention relates to eyeglasses, and is more particularly concerned with a temple piece for eyeglasses to maintain proper positioning of the eyeglasses while relieving the bridge of the nose of the wearer of the excessive weight.

Through the years there has been an incessant effort to design eyeglasses that would fit comfortably on a person, and stay in the proper position for full advantage of the lens design. Though many improvements have been made, there are still numerous problems with the current designs of eyelgasses.

The basic arrangement for eyeglasses of the prior art includes nosepieces that are between the lenses to rest on the bridge of the wearer's nose, and temple pieces to pass over and behind the ears. Thus, the bridge of the nose carries the weight of the lenses while the ears prevent forward motion of the eyeglasses.

There are two primary problems with the usual arrangement of eyeglasses, and these are: that the weight on the bridge of the nose causes some skin trauma so that the wearer becomes very uncomfortable; and, due to the incline of the bridge of the nose, the nose pieces tend to slide down the nose. The first of these problems is usually ameliorated by means of padding or the like, which is a nominal kind of solution. The second of these problems is usually ameliorated by either hooking the temple pieces more securely over the ears, which tends to make the back of the ears sore, or clamping the temple pieces more firmly against the head, which tends to make the head sore.

Thus, neither of the standard problems with eyeglasses is really solved by the usual methods and apparatuses of the prior art. Further, it should be realized that the problem of the glasses' sliding down the nose is not purely one of discomfort; rather, the lenses are designed such that the wearer must look through the optical axis of the lens for proper vision correction, and when the eyelgasses slide down, the wearer is looking through the lenses at a point above the optical axis, which partially defeats the vision correction.

SUMMARY OF THE INVENTION

The present invention overcomes the abovementioned and other problems with eyeglasses by providing a temple piece for eyeglasses that is weighted at its extending end. This arrangement counterbalances the weight of the eyeglasses that is concentrated in the lenses, using the top of the ears as a fulcrum. The weight is thereby substantially removed from the bridge of the nose and distributed between the two ears. The weighted temple piece is designed to be made integrally with a temple piece, or to be made separately and attached to an existing temple piece.

By thus weighting the temple pieces, the lenses are held up so that the wearer will look through the optical axis of the lenses, and so little weight remains to be supported by the bridge of the nose that the chance of skin trauma is relatively negligible.

These and other features and advantages of the present invention will become apparent from consideration of the following specification taken in conjunction with the accompanying drawing.

DESCRIPTION OF THE PREFERRED EMBODIMENTS

Figure 1:
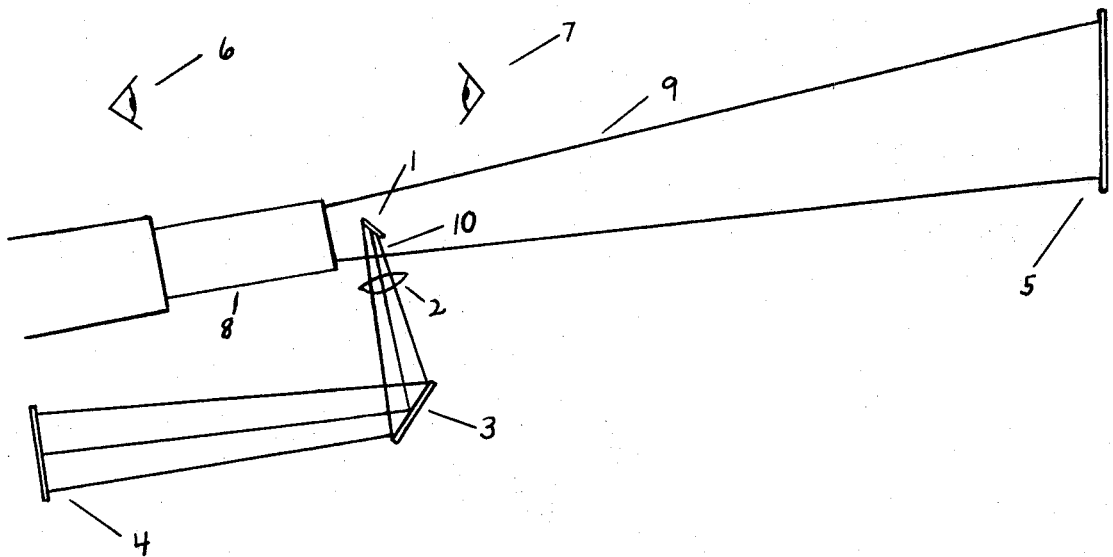
FIG. 1 is a side elevational view of a pair of eyeglasses having temple pieces according to a disclosed embodiment of the present invention thereon, and showing a wearer in phantom.

Referring now more particularly to the drawing and to those embodiments here chosen by way of illustration, it will be seen that FIG. 1 shows one design of the temple piece in conjunction with a pair of eyeglasses. The temple piece 10 includes the usual hinge 11 at one end of the temple piece 10, a substantially conventional central member 12, and a hook member 14 at the opposite end of the temple piece 10.

The basic shape of the temple piece is rather conventional, but the hook member 14 is weighted as will be described more fully hereinafter.

In FIG. 1, the arrow 15 indicates the downward force exerted by the weight of the lenses 16 and their frame 18. It will be understood, however, that the frames 18 are generally of almost negligible weight, and the greater part of the force represented by the arrow 15 is from the lenses 16.

The arrow 19 represents the upward force exerted by the ear E of the wearer W, and the arrow 20 represents the downward force caused by the weighted hook member 14. It will thus be realized that the arrow 19 indicates the fulcrum in a simple lever system in which the arrow 15 represents the load and the arrow 20 represents the force.

In the conventional eyeglasses in which the lenses 16 are made of glass, even lenses with a relatively large correction will generally weigh no more than 2 ounces. Since there are two temple pieces 10 on each pair of eyeglasses, each temple piece having a hook member 14, it will be seen that the total weight represented by the arrow 15 can be distributed evenly between the two temple pieces 10.

Now, to determine the amount of weight required in the hook member 14, one must simply apply the standard equilibrium equation: $f_1 d_1 = f_2 d_2$. Assuming that the lenses 16 and their frame 18 weigh a total of 2 ounces, the distance between the arrow 15 and the arrow 19 is 4 inches, and the distance between the arrow 19 and the arrow 20 is 1 inch, the force required at arrow 20 will be determined to be 8 ounces. This must of course be divided between the two temple pieces 10, so that each hook member 14 should have a weight of 4 ounces.

The total weight of the eyeglasses has thus been increased from slightly over 2 ounces to slightly over 10 ounces; however, the important consideration is that the point at which the weight is concentrated is shifted from the bridge of the nose to the ears of the wearer. This is especially desirable in view of the fact that the bridge of the nose, where eyeglasses are normally worn, comprises bone and skin with virtually no adipose tissue to act as cushioning. Contrarily, the upper portion of the ears have only cartilage as the underlying material; and, there is a certain amount of adipose tissue at this point. This combination provides a substantial amount of natural cushioning so that much more weight can be tolerated.

Further, if a wearer is peculiarly lacking in adipose tissue in the vicinity of the upper portion of the ears, an additional cushioning can be provided in the form of a pad 21. This pad can be made of any good cushioning material such as an expanded polyurethane, foamed rubber, or any of nmerous other cushioning materials.

From the foregoing, it will now be realized that the hook members 14 are weighted to an extent that the weight of the lenses is removed from the bridge of the nose and moved to the top of the ears. In practice, it may be desirable to arrange the weight of the hook member 14 so that some weight remains at the bridge of the nose, in which case the weight on the nose would be lessened to the extent that the liklihood of skin trauma is negligible.

In the embodiment of the invention shown in FIG. 1 of the drawings, the eyeglasses are maintained in their rearward position due solely to the fact that the hook member 14 turns down immediately rearward of the ear E. In the event that this is not sufficient, the embodiment shown in FIG. 2 provides a more nearly certain means to hold the eyeglasses in their appropriate rearward position.

Figure 2:
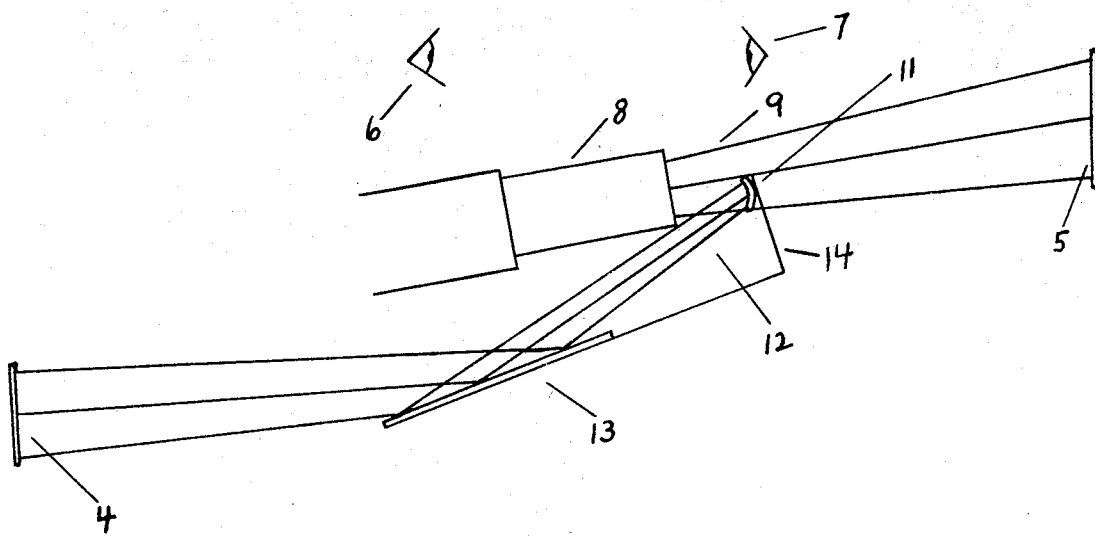
FIG. 2 is a fragmentary view showing a slightly modified form of the disclosed embodiment of the present invention.
Figure 1:
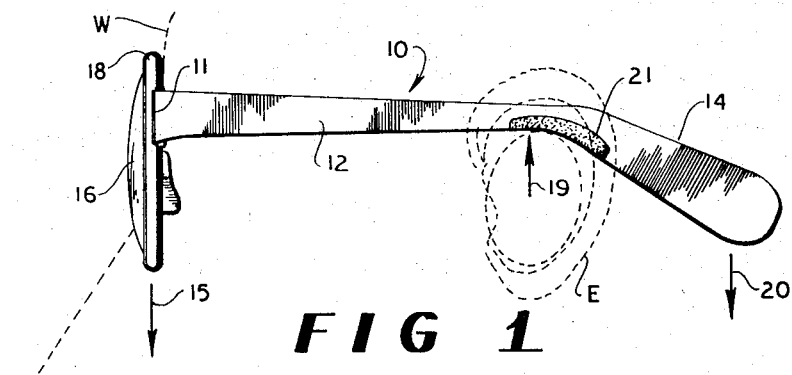
Figure 2:
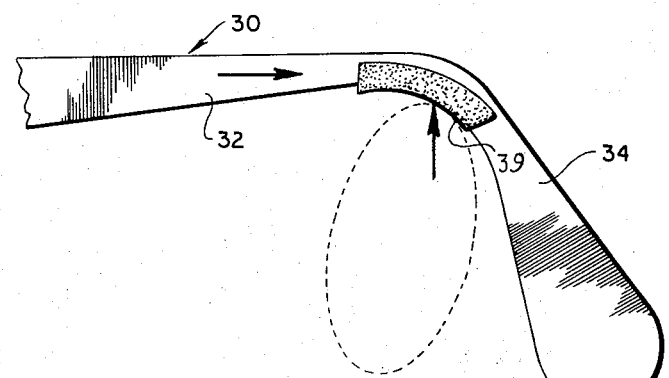

Referring more specifically to FIG. 2, it will be seen that the temple piece 30 includes a hook member 34 that is turned down to a much greater extent than is the hook member 14 of the temple piece 10. Also, the central member 32 of the temple piece 30 would be somewhat foreshortened (for the same wearer) so that the temple piece 30 will contact the ear at a point that is sloped. Realizing that the hook member 34 is weighted as discussed in connection with the temple piece 10, it will be understood that the hook member 34 will continuously be urged down; and, the sloping point of contact 39 with the ear will tend to cause the temple piece 30 to move rearwardly. The rearward motion of the temple piece 30 will be stopped by engagement of the frame of the lenses with the forehead and/or the engagement of the nose pieces with the bridge of the nose.

Other than the above discussed difference, the embodiment of the invention shown in FIG. 2 operates the same as that shown in FIG. 1.

Figure 3:
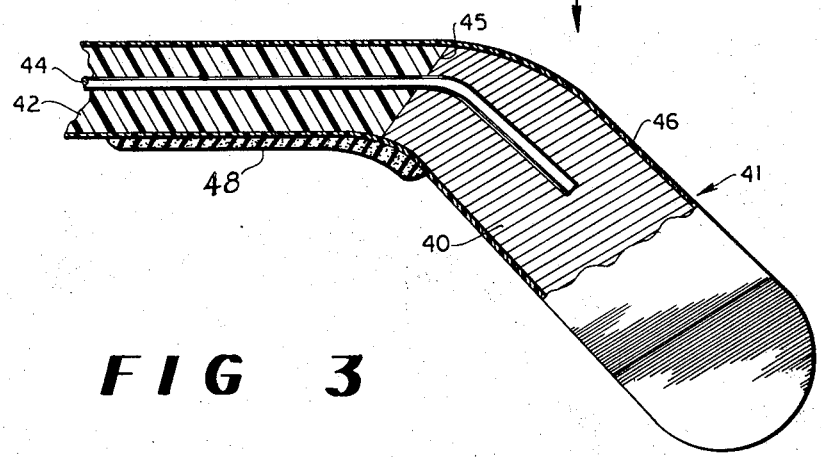
FIG. 3 is an enlarged fragmentary view of the weighted end of the temple piece, partially in cross-section.

Though the application of additional weight to the hook member 14 or 34 can be accomplished in numerous ways, and by numerous means, one such weight is illustrated in detail in FIG. 3 of the drawings.

As previously mentioned, the frames and the conventional temple pieces of eyeglasses are made of a lightweight plastic material or of a lightweight metal such as an alloy of aluminum. The material of the overall frame should not be changed because the entire pair of eyeglasses would be excessively heavy; thus, a material having a greater weight must be attached to the usual frame material. As shown in FIG. 3, a weight 40, preferably formed of lead or other relatively heavy material, is shaped to form the hook member 41. To attach the weight 40 to the central member 42, there is a shaft 44 embedded within the central member 42 and extending into the weight 40, thus providing sufficient holding force to prevent separation of the two materials. Of course, glue or some form of weld can be used at the junction 45 of the two materials, but this would normally not be enough to hold the materials firmly.

The embodiment shown in FIG. 3 indicates the central member 42 as being made of a plastic material. In order to enhance the appearance of the weight 40, it is contemplated that the weight 40 would be coated with a similar material as indicated at 46. For plastic materials, the weight 40 can be dip-coated or the like. If the central member 42 is made of a metal, the weight 40 can be painted, plated, or the like to provide a similar appearance.

An additional cushion 48 is also illustrated in FIG. 3, the purpose of which is the same as that discussed in connection with the cushion 21 of FIG. 1.

Figure 4:
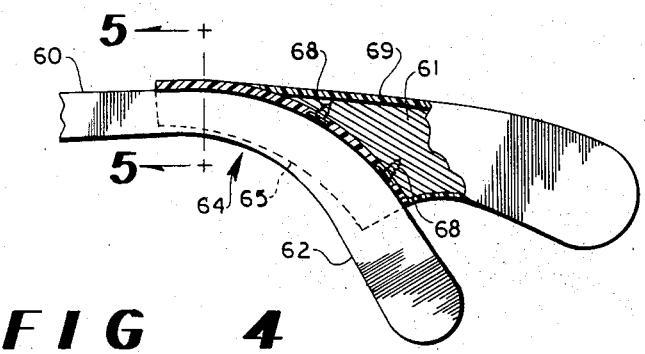
FIG. 4 is a cross-sectional view showing a modified form of the invention in which a separate weight is attachable to a standard temple piece; and, FIG. 5 is a cross-sectional view taken substantially along the line 5—5 in FIG. 4.

The embodiment of the invention as shown in FIG. 4 of the drawing has two advantages, the first of which is that the device is designed to be attached to an existing temple piece 60 of conventional design. It will be seen that the weight 61 is formed to be an extension from the hook member 62 and is carried by the hook member 62.

Figure 5:
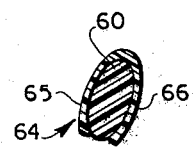

Though numerous means of attachment will readily suggest themselves to the person skilled in the art, the means here shown by way of illustration includes a channel member 64 having its legs 65 and 66 (see FIG. 5) biased towards each other. The channel member 64 is shaped along its length to conform to the hook member 62 so that the channel member 64 can be snapped over the hook member 62 of a conventional temple piece 60. The weight 61 is then carried by the channel member 64.

Again, due to the probable dissimilarity of the materials of the channel member 64 and the weight 61, the means for connecting the two materials is here shown as screws 68, though of course glue, welding, or any other available fastening means is equally contemplated.

As discussed in connection with FIG. 3 of the drawing, the weight 61 has a coating 69 to give the weight 61 an appearance similar to the appearance of the temple piece 60.

The second advantage of the embodiment shown in FIG. 4 of the drawing is that the lever arm through which the weight 61 acts is lengthened. In view of the standard equilibrium equation mentioned above, it will be understood that, as this lever arm is lengthened, the amount of the weight can be lessened. Because of this, it may be desirable at times to use the arrangement shown in FIG. 4, but permanently attached as discussed in connection with the other embodiments of the invention.

It will of course be understood that the embodiments of the invention here presented are by way of illustration only, and are meant to be in no way restrictive; therefore, numerous changes and modifications may be made, and the full use of equivalents resorted to, without departing from the scope of the invention as defined by the appended claims.

What is claimed is:

1. In a pair of eyeglasses having a pair of lenses, a frame for the lenses, nosepieces disposed between the lenses and adapted to rest on the bridge of the nose of the wearer, and a pair of temple pieces extending from the frame rearwardly and over the ears of the wearer and terminating in hook members, the improvement wherein the said temple pieces are substantially rigid, said hook members are substantially rigid, and including means releasably carried by said hook members and extending rearwardly therefrom and divergent from said hook members for weighting said hook members rearwardly of the ears of the wearer, the arrangement being such that the ears of the wearer act as the fulcrum for said means for weighting to counterbalance the weight of the said lenses and the said frame said releasable means for weighting including a channel defined by a pair of leg members spaced apart from and confronting each other, said spacing apart defining said channel of normal width slightly less than the width of a said hook member, said leg members being resiliently yieldable away from each other to an extent defining a channel width permitting said legs to extend over and along opposed sides of said hook member in resilient retention thereon, and a quantity of heavy material relative to the weight of the temple piece integrally connected to said channel and positioned rearwardly thereof.

2. A pair of eyeglasses according to claim 1 wherein said means for weighting the said hook members comprises hook members formed of a material that is relatively heavy relative to the material of said frame.

3. A pair of eyeglasses according to claim 2 and further including cushioning means carried by the said temple pieces and located at the said fulcrum to engage the ears of the wearer.

* * * * *